US006286479B1

(12) United States Patent
Cryer et al.

(10) Patent No.: US 6,286,479 B1
(45) Date of Patent: Sep. 11, 2001

(54) METHOD AND SYSTEM FOR PREDICTABLY ASSESSING PERFORMANCE OF A FUEL PUMP IN A LOCOMOTIVE

(75) Inventors: Robert Douglas Cryer; Sagar Arvindbhai Patel; Shawn Michael Gallagher, all of Erie, PA (US)

(73) Assignee: General Electric Company

(*) Notice: Subject to any disclaimer, the term of this patent is extended or adjusted under 35 U.S.C. 154(b) by 0 days.

(21) Appl. No.: 09/431,721

(22) Filed: Oct. 28, 1999

(51) Int. Cl.[7] .............................. G01P 5/00; F02D 41/22
(52) U.S. Cl. ......................... 123/359; 73/119 A; 701/107
(58) Field of Search .................................... 123/359, 479, 123/198 D; 73/119 A, 119 R; 701/107

(56) References Cited

U.S. PATENT DOCUMENTS

| | | | | |
|---|---|---|---|---|
| 4,270,174 | | 5/1981 | Karlin et al. . | |
| 4,463,418 | | 7/1984 | O'Quin, II et al. . | |
| 4,491,112 | | 1/1985 | Kanegae et al. . | |
| 4,509,480 | * | 4/1985 | Kull et al. | 123/359 |
| 4,515,125 | * | 5/1985 | Buck et al. | 123/359 |
| 4,517,468 | | 5/1985 | Kemper et al. . | |
| 4,695,946 | | 9/1987 | Andreasen et al. . | |
| 4,823,914 | | 4/1989 | McKinney et al. . | |
| 4,970,725 | | 11/1990 | McEnroe et al. . | |
| 4,977,390 | | 12/1990 | Saylor et al. . | |
| 5,113,489 | | 5/1992 | Cihiwsky et al. . | |
| 5,123,017 | | 6/1992 | Simpkins et al. . | |
| 5,274,572 | | 12/1993 | O'Neill et al. . | |
| 5,282,127 | | 1/1994 | Mii . | |
| 5,321,837 | | 6/1994 | Daniel et al. . | |
| 5,329,465 | | 7/1994 | Arcella et al. . | |
| 5,377,112 | | 12/1994 | Brown, Jr. et al. . | |
| 5,394,851 | * | 3/1995 | Cryer et al. | 123/476 |
| 5,400,018 | | 3/1995 | Scholl et al. . | |
| 5,406,502 | | 4/1995 | Haramaty et al. . | |
| 5,445,347 | | 8/1995 | Ng . | |
| 5,508,941 | | 4/1996 | Leplingard et al. . | |
| 5,528,516 | | 6/1996 | Yemini et al. . | |
| 5,594,663 | | 1/1997 | Messaros et al. . | |
| 5,633,628 | | 5/1997 | Denny et al. . | |
| 5,638,296 | | 6/1997 | Johnson et al. . | |
| 5,661,668 | | 8/1997 | Yemini et al. . | |
| 5,666,534 | | 9/1997 | Gilbert et al. . | |
| 5,678,002 | | 10/1997 | Fawcett et al. . | |
| 5,732,676 | * | 3/1998 | Weisman et al. | 123/436 |
| 5,742,915 | | 4/1998 | Stafford . | |
| 5,845,272 | | 12/1998 | Morjaria et al. . | |
| 6,076,504 | * | 6/2000 | Stavnheim et al. | 123/479 |
| 6,109,244 | * | 8/2000 | Yamamoto et al. | 123/478 |

FOREIGN PATENT DOCUMENTS 0 810 364 A3 7/2000 (EP) .

OTHER PUBLICATIONS

Data–Tronic Gas Turbine Information And Control System; General Electric Gas Turbine Reference Library; 8 pgs.

* cited by examiner

*Primary Examiner*—Andrew M. Dolinar
*Assistant Examiner*—Arnold Castro
(74) *Attorney, Agent, or Firm*—Carl A. Rowold, Esq; Enrique J. Mora, Es; Beusse, Brownlee, Bowdoin & Wolter PA

(57) ABSTRACT

A method and system for determining degradation of fuel pump performance in a locomotive having an internal combustion engine is provided. The method allows for monitoring a signal indicative of a fuel value delivered by the fuel pump and for adjusting the value of the monitored signal for deviations from an estimated nominal fuel value due to external variables to generate an adjusted fuel value. The method further allows for comparing the value of the adjusted fuel value against the nominal fuel value to determine the performance of the pump.

24 Claims, 7 Drawing Sheets

PROBABILITY

PROBABILITY

METHOD AND SYSTEM FOR PREDICTABLY ASSESSING PERFORMANCE OF A FUEL PUMP IN A LOCOMOTIVE

BACKGROUND OF THE INVENTION

The present invention relates generally to locomotives having an internal combustion engine, and, more particularly, to a system and method for predicting impending failures of a fuel delivery subsystem in the locomotive.

As will be appreciated by those skilled in the art, a locomotive is a complex electromechanical system comprised of several complex subsystems. Each of these subsystems, such as the fuel delivery subsystem, is built from components which over time fail. The ability to automatically predict failures before they occur in the locomotive subsystems is desirable for several reasons. For example, in the case of the fuel delivery subsystem, that ability is important for reducing the occurrence of primary failures which result in stoppage of cargo and passenger transportation. These failures can be very expensive in terms of lost revenue due to delayed cargo delivery, lost productivity of passengers, other trains delayed due to the failed one, and expensive on-site repair of the failed locomotive. Further, some of those primary failures could result in secondary failures that in turn damage other subsystems and/or components. It will be further appreciated that the ability to predict failures before they occur in the fuel delivery subsystem would allow for conducting condition-based maintenance, that is, maintenance conveniently scheduled at the most appropriate time based on statistically and probabilistically meaningful information, as opposed to maintenance performed regardless of the actual condition of the subsystems, such as would be the case if the maintenance is routinely performed independently of whether the subsystem actually needs the maintenance or not. Needless to say, a condition-based maintenance is believed to result in a more economically efficient operation and maintenance of the locomotive due to substantially large savings in cost. Further, such type of proactive and high-quality maintenance will create an immeasurable, but very real, good will generated due to increased customer satisfaction. For example, each customer is likely to experience improved transportation and maintenance operations that are even more efficiently and reliably conducted while keeping costs affordable since a condition-based maintenance of the locomotive will simultaneously result in lowering maintenance cost and improving locomotive reliability.

Previous attempts to overcome the above-mentioned issues have been generally limited to diagnostics after a problem has occurred, as opposed to prognostics, that is, predicting a failure prior to its occurrence. For example, previous attempts to diagnose problems occurring in a locomotive have been performed by experienced personnel who have in-depth individual training and experience in working with locomotives. Typically, these experienced individuals use available information that has been recorded in a log. Looking through the log, the experienced individuals use their accumulated experience and training in mapping incidents occurring in locomotive subsystems to problems that may be causing the incidents. If the incident-problem scenario is simple, then this approach works fairly well for diagnosing problems. However, if the incident-problem scenario is complex, then it is very difficult to diagnose and correct any failures associated with the incident and much less to prognosticate the problems before they occur.

Presently, some computer-based systems are being used to automatically diagnose problems in a locomotive in order to overcome some of the disadvantages associated with completely relying on experienced personnel. Once again, the emphasis on such computer-based systems is to diagnose problems upon their occurrence, as opposed to prognosticating the problems before they occur. Typically, such computer-based systems have utilized a mapping between the observed symptoms of the failures and the equipment problems using techniques such as a table look up, a symptom-problem matrix, and production rules. These techniques may work well for simplified systems having simple mappings between symptoms and problems. However, complex equipment and process diagnostics seldom have simple correspondences between the symptoms and the problems. Unfortunately, as suggested above, the usefulness of these techniques have been generally limited to diagnostics and thus even such computer-based systems have not been able to provide any effective solution to being able to predict failures before they occur.

In view of the above-mentioned considerations, there is a general need to be able to quickly and efficiently prognosticate any failures before such failures occur in the fuel delivery subsystem of the locomotive, while minimizing the need for human interaction and optimizing the repair and maintenance needs of the subsystem so as to able to take corrective action before any actual failure occurs.

BRIEF SUMMARY OF THE INVENTION

Generally speaking, the present invention fulfills the foregoing needs by providing a method for determining degradation of fuel pump performance in a locomotive having an internal combustion engine. The method allows for monitoring a signal indicative of a fuel value delivered by the fuel pump and for adjusting the value of the monitored signal for deviations from an estimated nominal fuel value due to predetermined external variables to generate an adjusted fuel value. The method further allows for comparing the value of the adjusted fuel value against the nominal fuel value to determine the performance of the pump.

The present invention further fulfills the foregoing needs by providing a system for determining degradation in fuel pump performance in a locomotive having an internal combustion engine. The system includes a signal monitor coupled to monitor a signal indicative of a fuel value delivered by the fuel pump. A first module is coupled to the signal monitor to adjust the monitored signal for deviations from an estimated nominal fuel value due to predetermined external variables to generate an adjusted fuel value. A second module is coupled to the first module to receive the adjusted fuel value. The second module is configured to compare the value of the adjusted fuel value against a nominal fuel value to determine the performance of the pump.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
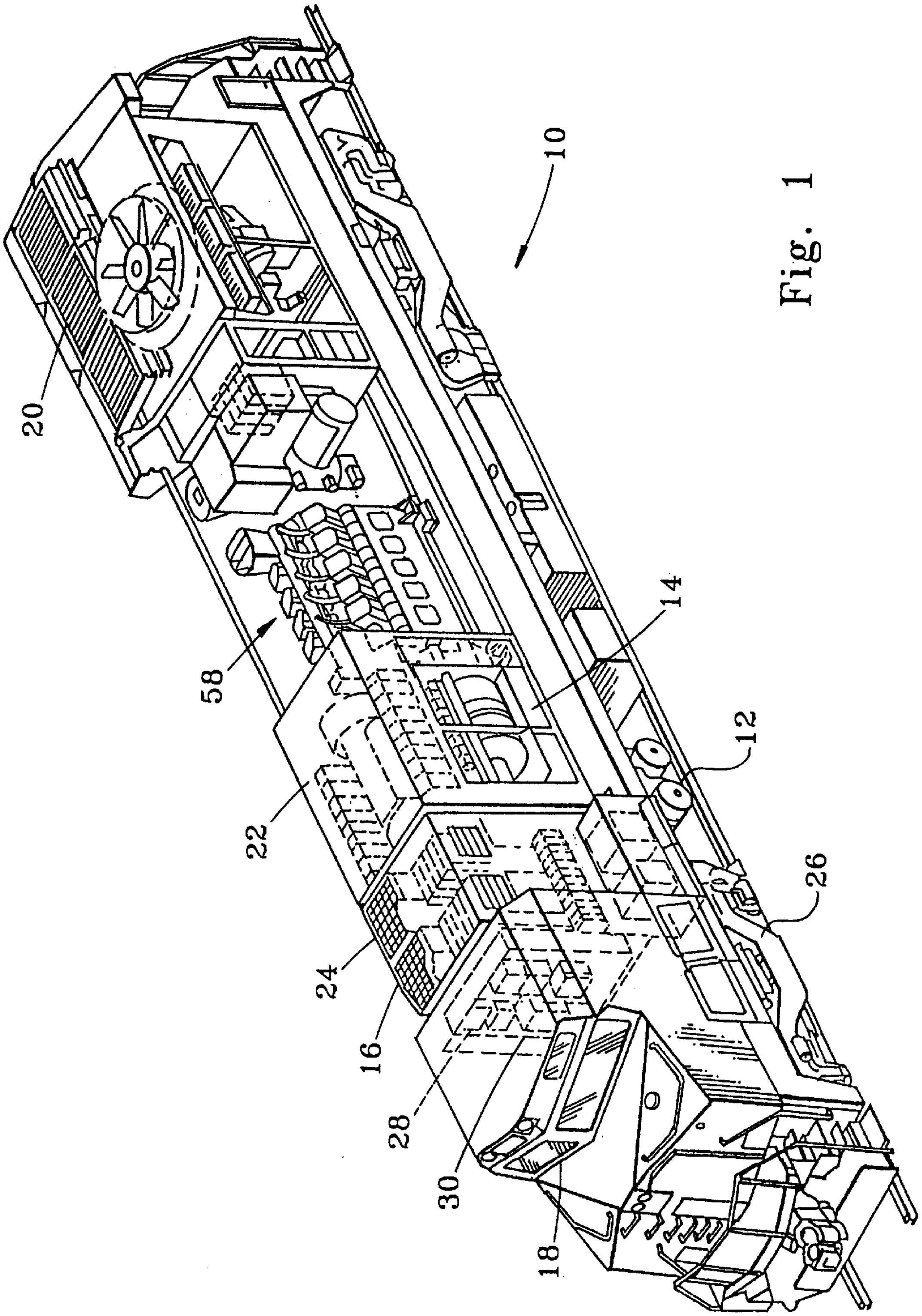
FIG. 1 shows an exemplary schematic of a locomotive.

FIG. 1 shows a schematic of a locomotive 10, that may be either an AC or DC locomotive. As will be appreciated by those skilled in the art, the locomotive 10 is comprised of several relatively complex subsystems, each performing separate functions. By way of background some of the subsystems and their functions are listed below.

An air and air brake subsystem 12 provides compressed air to the locomotive, which uses the compressed air to actuate the air brakes on the locomotive and cars behind it.

An auxiliary alternator subsystem 14 powers all auxiliary equipment. In particular, subsystem 14 supplies power directly to an auxiliary blower motor and an exhauster motor. Other equipment in the locomotive is powered through a cycle skipper.

A battery and cranker subsystem 16 provides voltage to maintain the battery at an optimum charge and supplies power for operation of a DC bus and a HVAC system.

A communications subsystem collects, distributes, and displays communication data across each locomotive operating in hauling operations that use multiple locomotives.

A cab signal subsystem 18 links the wayside to the train control system. In particular, the system 18 receives coded signals from the rails through track receivers located on the front and rear of the locomotive. The information received is used to inform the locomotive operator of the speed limit and operating mode.

A distributed power control subsystem provides remote control capability of multiple locomotive-consists anywhere in the train. It also provides for control of tractive power in motoring and braking, as well as air brake control.

An engine cooling subsystem 20 provides the means by which the engine and other components reject heat to the cooling water. In addition, it minimizes engine thermal cycling by maintaining an optimal engine temperature throughout the load range and prevents overheating in tunnels.

An end of train subsystem provides communication between the locomotive cab and the last car via a radio link for the purpose of emergency braking.

An equipment ventilation subsystem 22 provides the means to cool the locomotive equipment.

An event recorder subsystem records FRA required data and limited defined data for operator evaluation and accident investigation. For example, such recorder may store about 72 hours or more of data.

For example, in the case of a locomotive that uses one or more internal combustion engines, such as a diesel engine or prime mover 58 that provides torque to the alternator for powering the traction motors and auxiliary subsystems, a fuel monitoring subsystem provides means for monitoring the fuel level and relaying the information to the crew. Of particular interest for this invention, and as will be discussed in greater detail in the context of FIG. 2, a fuel delivery subsystem provides means for delivering a precisely metered amount of fuel to each cylinder of the engine, e.g., 8, 12, 16 or more cylinders. As suggested above, it is desired to develop a predictive diagnostic strategy that is suitable to predict incipient failures in the fuel delivery subsystem.

A global positioning subsystem uses NAVSTAR satellite signals to provide accurate position, velocity and altitude measurements to the control system. In addition, it also provides a precise UTC reference to the control system.

A mobile communications package subsystem provides the main data link between the locomotive and the wayside via a 900 MHz radio.

A propulsion subsystem 24 provides the means to move the locomotive. It also includes the traction motors and dynamic braking capability. In particular, the propulsion subsystem 24 receives electric power from the traction alternator and through the traction motors, converts that power to locomotive movement. The propulsion subsystem may include speed sensors that measure wheel speed that may be used in combination with other signals for controlling wheel slip or creep either during motoring or braking modes of operation using control technique well-understood by those skilled in the art.

A shared resources subsystem includes the I/O communication devices, which are shared by multiple subsystems.

A traction alternator subsystem 26 converts mechanical power to electrical power which is then provided to the propulsion system.

A vehicle control subsystem reads operator inputs and determines the locomotive operating modes.

The above-mentioned subsystems are monitored by one or more locomotive controllers, such as a locomotive control system 28 located in the locomotive. The locomotive control system 28 keeps track of any incidents occurring in the subsystems with an incident log. An on-board diagnostics subsystem 30 receives the incident information supplied from the control system and maps some of the recorded incidents to indicators. The indicators are representative of observable symptoms detected in the subsystems. Further background information regarding an exemplary diagnostic subsystem may be found in U.S. Pat. No. 5,845,272, assigned to the same assignee of the present invention and herein incorporated by reference.

Figure 2:
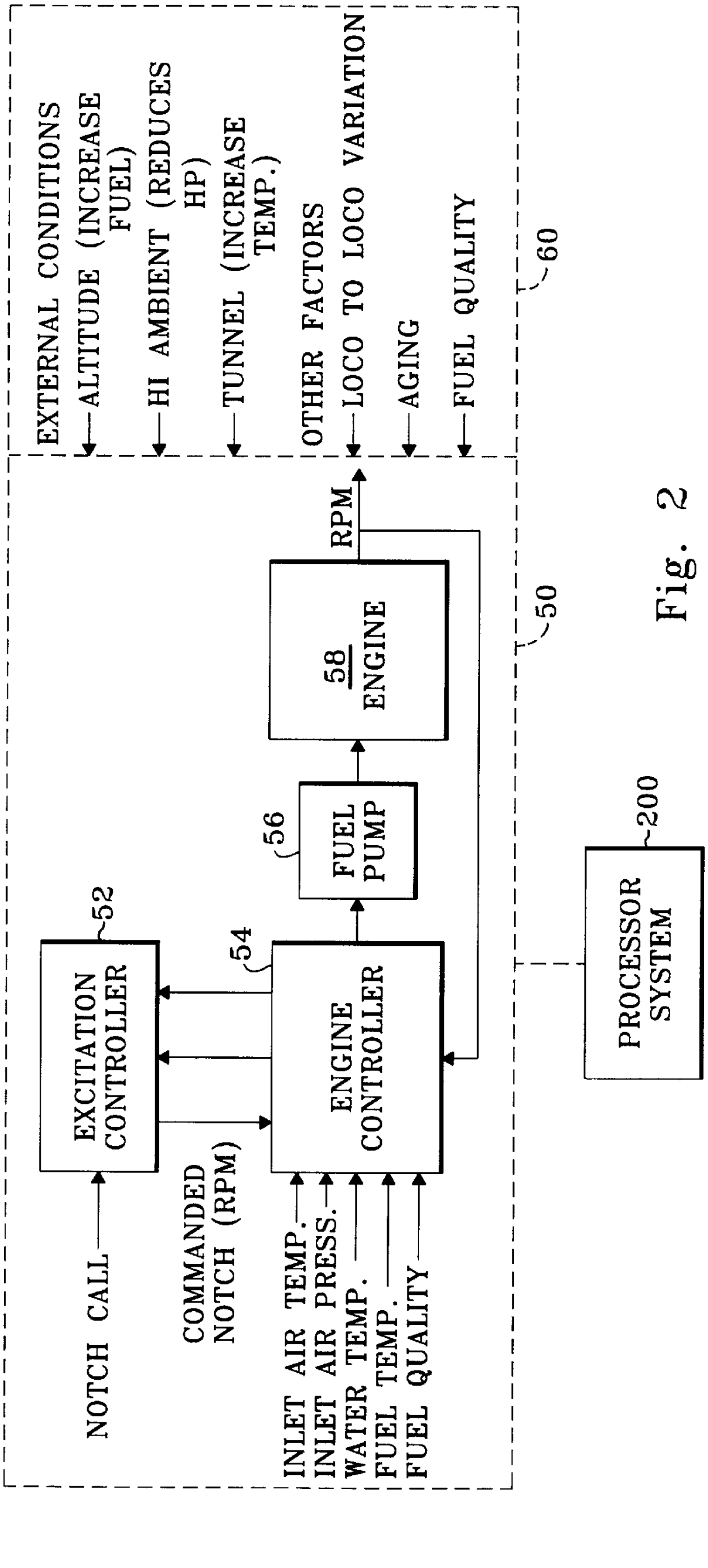
FIG. 2 shows an exemplary fuel delivery subsystem.

FIG. 2 shows an exemplary fuel delivery subsystem 50 that includes an excitation controller 52 which is connected to an electronic governor unit (EGU) or engine controller 54. As will be appreciated by those skilled in the art, excitation controller 52 receives a notch call signal, that is, an engine speed command signal from the master controller of the engine and in response to the notch call signal the excitation controller issues a commanded engine RPM signal which is supplied to EGU 54. EGU 54 in turns issues a fuel pump control signal to provide electromechanical control to a high pressure fuel pump 56. Fuel pump 56 in turn is connected to a respective fuel injector to deliver fuel to a given cylinder of engine 58. Engine 58 maybe an internal combustion engine, such as a diesel fuel engine that may have multiple cylinders and provides mechanical power to a generator that supplies electrical power to, for example, the traction motors in the locomotive. As will be appreciated by those skilled in the art, a fuel value parameter, that is, the amount of fuel to be delivered into each of the cylinders of the engine is adjusted up or down by the EGU controller in order to maintain constant engine speed as the operating load of the locomotive varies or as the individual fuel pumps wear out or fail, or as the locomotive operates in environmentally demanding conditions, such as substantially low ambient temperature or barometric pressure, or traveling in a tunnel that may result in relatively high ambient temperature, etc.

As described in further detail below, an estimation of the fuel value calculated by the EGU controller is helpful for determining whether any of the fuel pumps has either failed or has begun to show varying degrees of deterioration. In the event that one or more pumps, singly or in combination, fail to perform within acceptable levels, this condition effectively results in an overall fewer number of pumps available for injecting fuel into engine 58. By way of example, wear out of various components within the pump may cause the pump to deliver less fuel or may cause the pump not to deliver any fuel to its respective fuel injector. Typical failure modes may include valve seat wear, stator cavitation, loose or broken belts, and other failures. In the event that either of these conditions are present, some of the primary effects may result as previously suggested, in the pump not supplying any fuel, or in supplying a lower amount of fuel than under standard operating conditions. For example, for a notch call signal of eight, a fuel pump may have a rate of fuel delivery of about 1450 cubic millimeters per stroke. It will be appreciated, however, that as the pump wears out, the pump may require more solenoid "on time" to deliver the same amount of fuel due to lower fuel injection pressures across the same physical restriction, such as the diameter of an injector nozzle. In another advantage of the present invention, it is desirable to use existing signals that are available without having to add additional sensors to the locomotive. In particular, there is a feedback signal supplied by EGU controller 54 that is indicative of power piston gap and monitoring of this signal and through uses of a suitable transfer function allows for accurately estimating the fuel value based on the following equation:

$$PFV=k1-(K2\times LVDT), \qquad \text{Eq. 1}$$

wherein K1 and K2 are experimentally and/or empirically derived constants and LVDT is the signal indicative of the power piston gap (PPG) as could be supplied by a displacement transducer. As will be appreciated by those skilled in the art, this is a technique that may be used for measuring the fuel value and is analogous to measuring a throttle valve position. As indicated within block 60 in FIG. 2, there are a number of external conditions and other factors that may affect the actual value of the fuel value actually delivered by fuel pump 56. Examples of such external conditions and factors may include the altitude where the locomotive operates, the ambient temperature, whether the locomotive is traveling in a tunnel since tunnel travel may result in increased operating temperature, locomotive to locomotive variation, age of the fuel pump and the type of fuel quality used by the locomotive, such as fuel octane or cetane level or heating value and the like. Thus, it would be particularly desirable to adjust the value of the monitored PPG signal for deviations from the predicted fuel value obtained from Eq. 1 above. The adjusted fuel value (AFV) may be computed based on the following equation:

$$AFV=PFV/KAT\times KBP\times KFT\times KFQ\times KL-L\times KAGE, \qquad \text{Eq. 2}$$

wherein PFV is the predicted fuel value and KAT, KBP, KFT, KFQ, KL–L, and KAGE denote a respective corrective or adjusting factor respectively corresponding to the following predetermined external variables: air temperature, barometric pressure, fuel quality, and fuel temperature.

Based on data analysis that has been performed on collected data, it has been found that respective values for each correcting factor maybe be computed, assuming the indicated units, as follows:

$$(KAT)=0.0009695*(\text{Ambient Air Temp. degC})+0.97382, \qquad \text{Eq. 3}$$

$$(KPB)=(750/(25.1*\text{Baro.Press, in.Hg}))\hat{\ }0.093 \qquad \text{Eq. 4}$$

$$(KFQ)=137.9/(\text{Fuel Qual.,Btu /Gal}), \qquad \text{Eq. 5}$$

$$(KFT)=(0.0027*\text{Fuel Temp.degC})+0.9271, \qquad \text{Eq. 6}$$

In the preferred embodiment of the invention since there is not a sensor that directly indicates a measurement of fuel temperature, it has been found that substantially accurate calculation for fuel temperature maybe obtained by correlating engine water temperature and ambient temperature so as to generate a mathematical relationship between the two known variables and fuel temperature. In particular, it has been found that:

$$\text{Predicted Fuel Temp}=A+B(\text{Eng.Water Temp})+C*(\text{Amb. Temp})\hat{\ }2 \qquad \text{Eq. 7}$$

wherein A, B and C respectively represent numerical coefficients that may vary depending on the specific locomotive implementation and that may be readily derived from collected and/or simulated data.

A processor system 200 may be coupled to fuel delivery subsystem 50 to monitor and collect the various signals that would allow the processor to assess the performance of the fuel delivery subsystem. It will be appreciated that processor system 200 may be installed on-board or could be installed at a remote diagnostics site that would allow a service provider to monitor a fleet of locomotives. By way of example, signal transmission from the locomotive to the diagnostics site could be implemented using a suitable wireless data communication system and the like.

Figure 3:
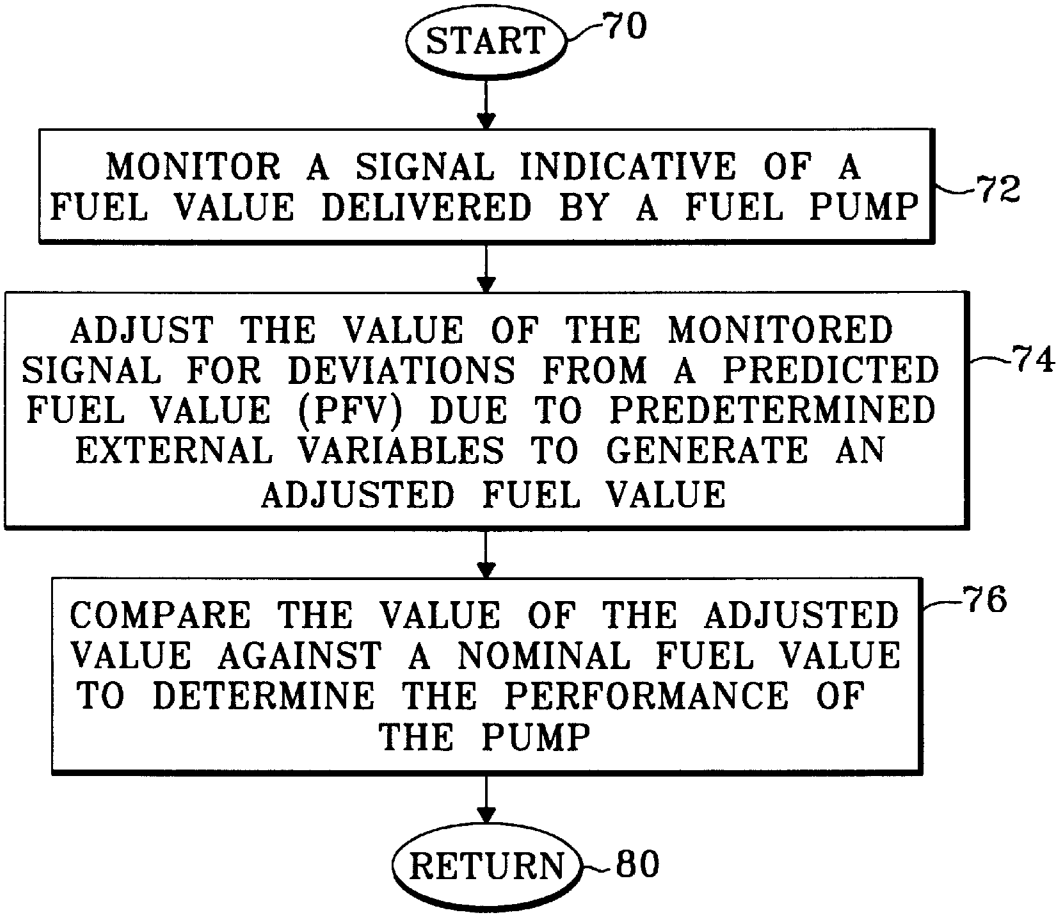
FIG. 3 is an exemplary flow chart of a method for predicting impending failures in the subsystem of FIG. 2.

As shown in FIG. 3, after start of operations in step 70, step 72 allows for monitoring a signal indicative of a fuel value delivered by the fuel pump. Step 74 allows for adjusting the value of the monitored signal for deviations from a predicted fuel value (PFV) due to predetermined external variables so as to generate an adjusted fuel value. Step 76 allows for comparing the adjusted fuel value against a nominal fuel value to determine the performance of the pump.

Figure 4:
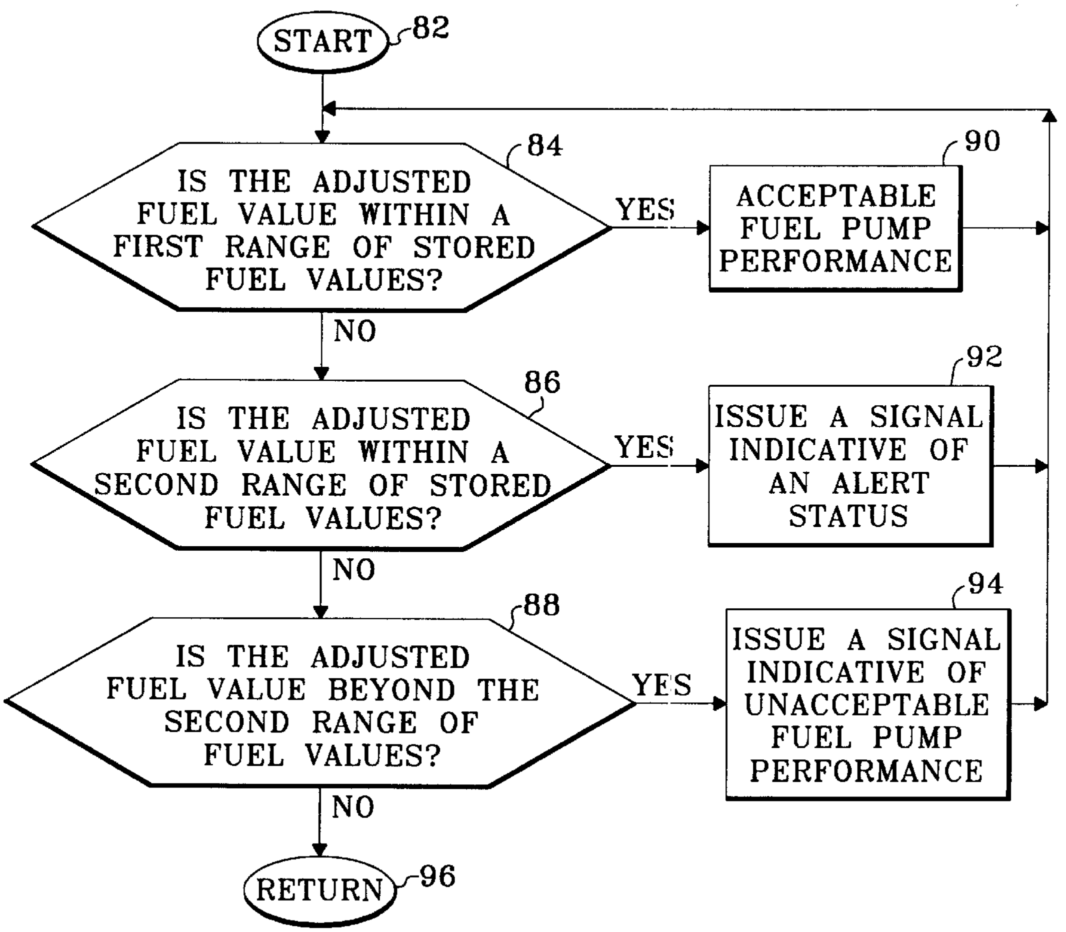
FIG. 4 illustrates an exemplary flow chart that allows for monitoring the performance of the fuel delivery subsystem.

As shown in FIG. 4, upon start of operations at step 82, tep 84 allows for determining whether the adjusted fuel value is within the first range of stored fuel values. As further shown in FIG. 4, if the answer is yes, step 90 allows for declaring that fuel pump performance is acceptable. If the answer is no, then step 86 allows for determining whether the adjusted fuel value is within a second range of stored fuel values. If the answer is yes, step 92 allows for issuing a signal that is indicative of an alert status or a warning signal to the user. If the adjusted fuel value is not within the second range of stored fuel values, step 88 allows for determining whether the adjusted fuel value is beyond the second range of fuel values. If the answer is yes, then step 94 allows for issuing a signal indicative of unacceptable fuel pump performance.

Figure 5:
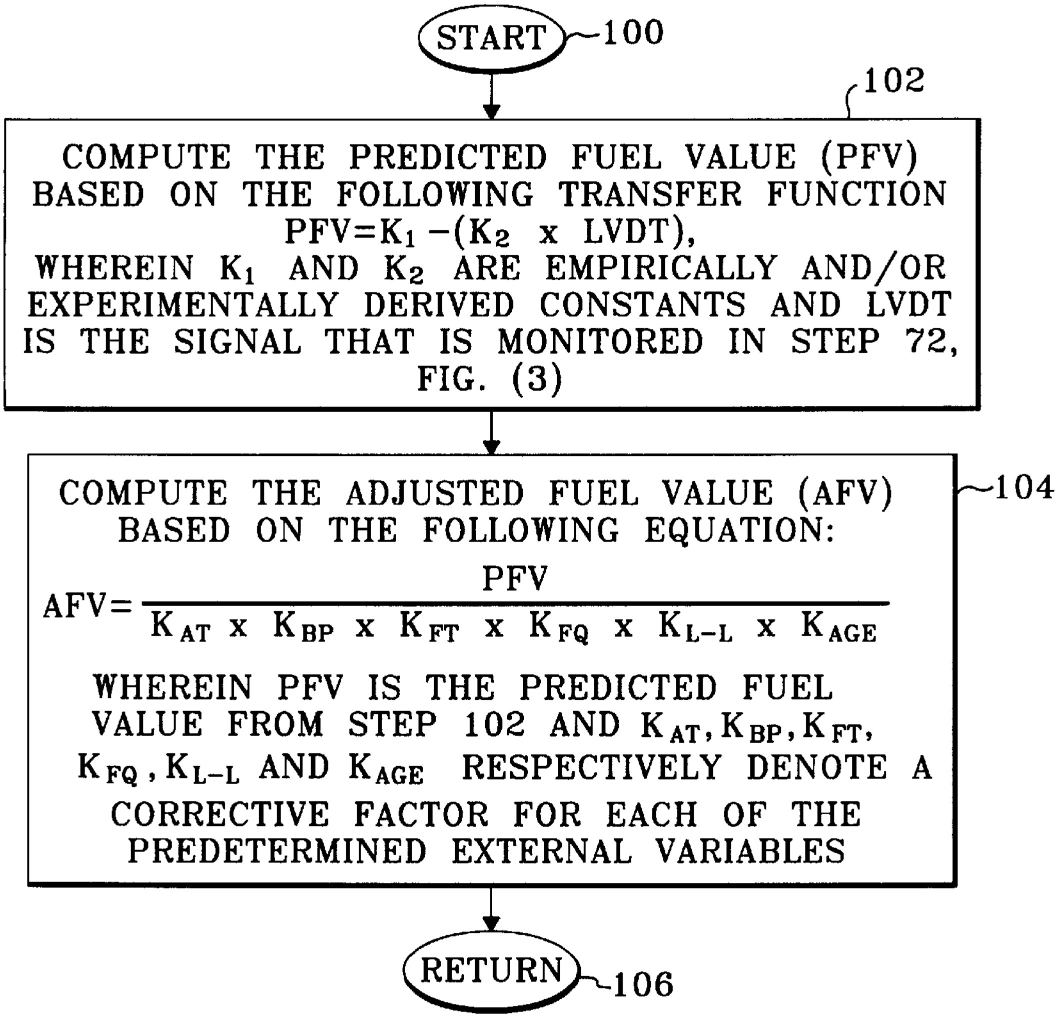
FIG. 5 illustrates further details regarding the flow chart shown in FIG. 3.

As shown in FIG. 5, subsequent to start step 100, step 102 allows for computing the predicted fuel value based on Eq. 1 and step 104 allows for computing the adjusted fuel value based on Eq. 2 prior to return step 106.

Figure 6:
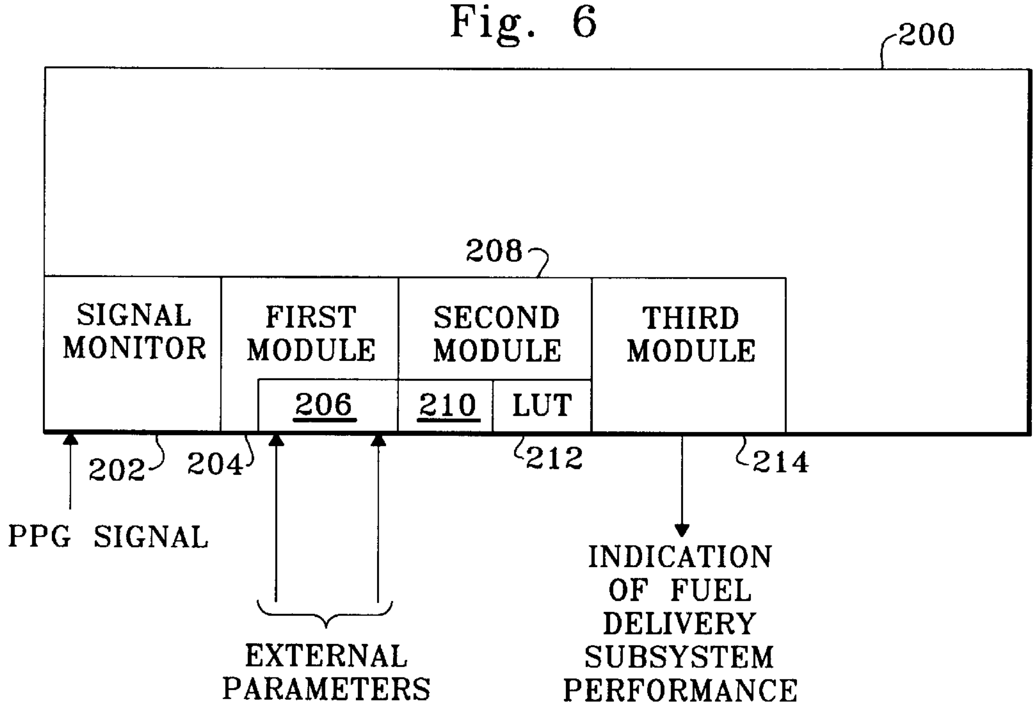
FIG. 6 shows a block diagram representation of a processor system that can be used for predicting impending failures in the subsystem of FIG. 2.

FIG. 6 shows further details regarding processor system 200 that includes a signal monitor 202 that receives the PPG signal used for calculating the predicted fuel value (PFV) from Eq. 1. A first module 204 is electrically coupled to signal monitor 202 to adjust the monitored signal or signals for deviations from the predicted fuel value due to predetermined external variables to generate the adjusted fuel value (AFV) of Eq. 2. It will be appreciated that other correcting or adjusting factors could be included in Eq. 2 to adjust for other parameters or variables, such as aging of the subsystem, subsystem variation from locomotive-to-locomotive, etc. The adjusting factors may be empirically or experimentally derived by collecting actual data and/or simulation data that takes into account multiple scenarios of locomotive operation, and should preferably include a sufficiently large sample of locomotives and/or fuel delivery subsystems so as to statistically demonstrate the validity and accuracy of the correcting factors and/or transfer function of Eq. 1. A submodule 206 in first module 204 allows for retrieving and/or generating the respective adjusting factors. A second module 208 is electrically coupled to first module 204 to receive the adjusted fuel value. Second module 208 includes a respective submodule 210 that allows for comparing the value of the adjusted fuel value against a nominal fuel value to determine the performance of the fuel delivery subsystem. A memory unit 212 may be used for storing a programmable look-up table for storing a first range of fuel values so that adjusted fuel values within that first range are indicative of acceptable fuel delivery subsystem performance. The look-up table in memory unit 212 may further be used for storing a second range of fuel values so that adjusted fuel values within the second range are indicative of degraded fuel delivery subsystem performance. A third module 214 may be readily used for generating and issuing a signal indicative of a degraded fuel delivery subsystem performance when the adjusted fuel value is beyond the first range of fuel values and within the second range of fuel values, that is, a cautionary signal that could be analogized to a yellow light in a traffic light. Similarly, module 214 may be used for generating and issuing a signal indicative of unacceptable fuel delivery subsystem performance when the adjusted fuel value is beyond an upper limit of the second range of fuel values, that is, a warning signal that could be analogized to a red light in a traffic light that requires immediate action by the operator. An exemplary first range of fuel values may be fuel values ranging from about of about 1450 cubic millimeters per stroke to about of about 1650 cubic millimeters per stroke. An exemplary second range of fuel values may range from about 1650 cubic millimeters per stroke to 1750 cubic millimeters per stroke. Thus, for the above ranges, if the result of Eq. 2, exceeds 1750 cubic millimeters per stroke, then third module 214 will issue the red alert signal. Similarly, if the result of Eq. 2, is within the second range of values, then module 214 will issue the yellow cautionary signal. Finally, if the result of Eq. 2, is within the first range of values, then module 214 will conveniently indicate that the status of the fuel delivery subsystem is within acceptable levels of performance.

Figure 7A:
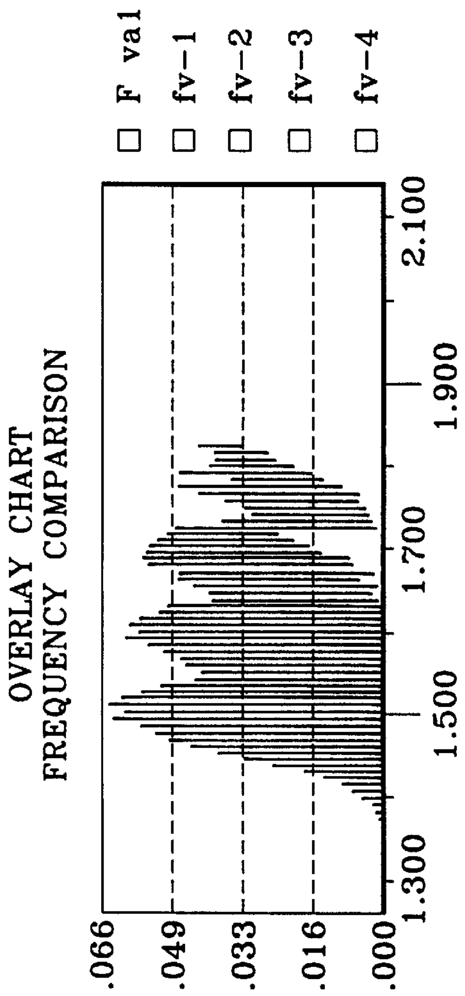
FIGS. 7A and 7B show exemplary probability distribution functions for various failure modes of the fuel delivery subsystem wherein the distribution function of FIG. 7A is uncompensated while the distribution function of FIG. 7B is compensated.
Figure 7B:
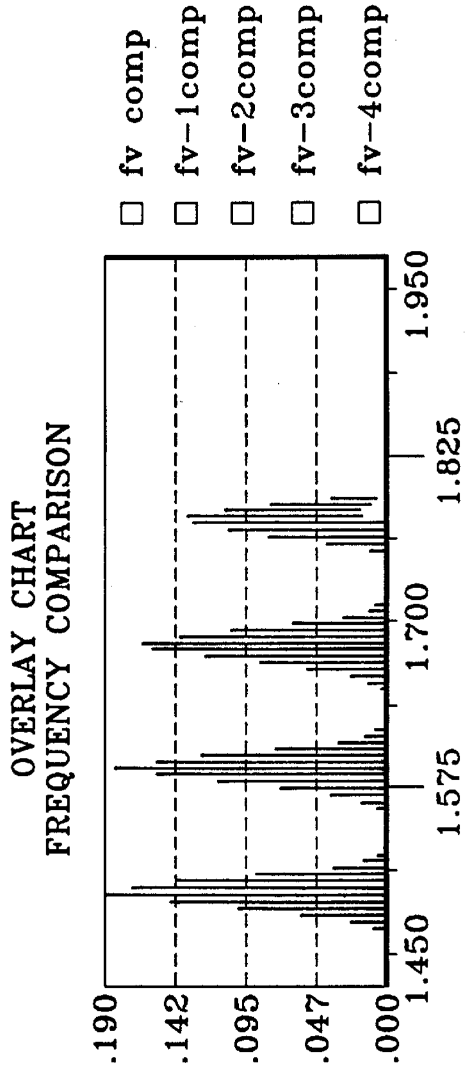

FIG. 7A shows exemplary probability distribution functions in the event that one, two, three, or four fuel pumps become disabled. In particular, FIG. 7A shows the distribution function in the case that fuel values have not been compensated for the various externals variables described above in the context of FIG. 2. By way of comparison, FIG. 7B shows the probability distribution for compensated fuel values in the event that there is a combined loss of one, two, three or four pumps. It will be appreciated that by virtue of the correction that can now be obtained with the present invention, the probability of detecting such multiple failures, singly or in combination, is now substantially improved since as can been in FIG. 7A, there is substantial overlap that may impair detection of such multi-failures whereas in FIG. 7B each respective probability function has a substantially narrow range of deviation that avoids overlap between the respective multiple failed conditions.

As will be appreciated by those skilled in the art, the tightened statistical deviation allows for enhanced and accurate determination of the multiple failures. It will be further appreciated that the multiple fuel pump failures need not directly correspond to a complete pump failure since, for example, the combination of two pumps operating at 50% efficiency may be equivalent to the loss of a single pump. Similarly, the combination of three pumps operating at 66.6% efficiency would be equivalent to the loss of a single pump.

While the preferred embodiments of the present invention have been shown and described herein in the context of a locomotive having a diesel engine, it will be obvious that such embodiments are provided by way of example only and not of limitation. Numerous variations, changes and substitutions will occur to those of skilled in the art without departing from the invention herein. For example, the present invention need not be limited to diesel engines for locomotive, since other types of engines used for automotive, marine or other applications can equally benefit from the teachings of the present invention. Accordingly, it is intended that the invention be limited only by the spirit and scope of the appended claims.

What is claimed is:

1. A method for determining degradation of fuel pump performance in an internal combustion engine, the method comprising:

sensing a signal indicative of estimated fuel values delivered by the pump, the estimated fuel values constituting a first set of fuel values influenced at least in part by a first set of operational and environmental conditions of the fuel pump;

monitoring at least one variable associated with the fuel pump at the time of the sensing of the estimated fuel values delivered by the pump, said at least one variable being indicative of the first set of operational and environmental conditions of the fuel pump;

providing a database of nominal fuel values based on data collected from a fleet of fuel pumps corresponding to the fuel pump whose performance is being determined, the nominal fuel values constituting a second set of fuel values relative to a second set of operational and environmental conditions for the fuel pumps;

accessing the database in light of the first set of operational and environmental conditions;

adjusting the respective values of one of the first and second sets of fuel values relative to the other to account for differences between the first and second sets of operational and environmental conditions; and comparing the respective set of adjusted values against said other set of fuel values to determine the relative performance of the fuel pump to the fleet of fuel pumps for detection of incipient failures of the fuel pump.

2. The method of claim 1 wherein the first set of fuel values is adjusted relative to the differences between the first and second sets of operational and environmental conditions.

3. The method of claim 1 wherein the second set of fuel values is adjusted relative to the differences between the first and second sets of operational and environmental conditions.

4. The method of claim 1 further comprising storing the adjusted values over time and determining trends in the adjusted values indicative of incipient failures of the fuel pump.

5. The method of claim 1 wherein said method is locally performed relative to the fuel pump.

6. The method of claim 1 further comprising transmitting the fuel values generated by the fuel pump to a remote site and the comparing is performed at the remote site to determine the performance of the fuel pump.

7. The method of claim 1 further comprising a step of storing a first range of fuel values so that respective adjusted fuel values within that first range are indicative of satisfactory fuel pump performance.

8. The method of claim 7 further comprising a step of storing a second range of fuel values so that respective adjusted fuel values within that second range are indicative of incipient malfunctions of the fuel pump.

9. The method of claim 8 wherein respective adjusted fuel values beyond that second range of values are indicative of unacceptable fuel pump performance.

10. The method of claim 1 wherein the variable associated with the fuel pump is selected from the group consisting of ambient air temperature, barometric pressure, fuel quality, fuel temperature, fuel pump age, and expected variation from pump-to-pump.

11. The method of claim 1 further comprising generating a respective adjusting factor for the at least one variable and wherein each adjusting factor is generated based on a predetermined compensation equation for said at least one variable.

12. The method of claim 11 wherein the adjusting factor for fuel temperature is derived based on correlating measurements of ambient temperature and water engine temperature to estimate the fuel temperature.

13. A system for determining degradation of fuel pump performance in an internal combustion engine, the system comprising:

at least one sensor configured to sense a signal indicative of estimated fuel values delivered by the pump, the estimated fuel values constituting a first set of fuel values influenced at least in part by a first set of operational and environmental conditions of the fuel pump;

a module for monitoring at least one variable associated with the fuel pump at the time of the sensing of the estimated fuel values delivered by the pump, said at least one variable being indicative of the first set of operational and environmental conditions of the fuel pump;

a database of nominal fuel values based on data collected from a fleet of fuel pumps corresponding to the fuel pump whose performance is being determined, the nominal fuel values constituting a second set of fuel values relative to a second set of operational and environmental conditions for the fuel pumps;

a processor configured to access the database in light of the first set of operational and environmental conditions, the processor including;

an adjuster module configured to adjust the respective values of one of the first and second sets of fuel values relative to the other to account for differences between the first and second sets of operational and environmental conditions; and a comparator configured to compare the respective set of adjusted values against said other set of fuel values to determine the relative performance of the fuel pump to the fleet of fuel pumps for detection of incipient failures of the fuel pump.

14. The system of claim 13 wherein the first set of fuel values is adjusted relative to the differences between the first and second sets of operational and environmental conditions.

15. The system of claim 13 wherein the second set of fuel values is adjusted relative to the differences between the first and second sets of operational and environmental conditions.

16. The system of claim 13 further comprising memory for storing the adjusted values over time and determining trends in the adjusted values indicative of incipient failures of the fuel pump.

17. The system of claim 13 wherein said system is locally situated relative to the fuel pump.

18. The system of claim 13 further comprising a communications device configured to transmit the fuel values generated by the fuel pump to a remote site and the processor is located at the remote site to determine the performance of the fuel pump.

19. The system of claim 13 further comprising memory for storing a first range of fuel values so that respective adjusted fuel values within that first range are indicative of satisfactory fuel pump performance.

20. The system of claim 19 wherein said memory is further configured to store a second range of fuel values so that respective adjusted fuel values within that second range are indicative of incipient malfunctions of the fuel pump.

21. The system of claim 20 wherein respective adjusted fuel values beyond that second range of values are indicative of unacceptable fuel pump performance.

22. The system of claim 13 wherein the at least one variable associated with the fuel pump is selected from the group consisting of ambient air temperature, barometric pressure, fuel quality, fuel temperature, fuel pump age, and expected variation from pump-to-pump.

23. The system of claim 13 further comprising a module for generating a respective adjusting factor for the at least one variable and wherein each adjusting factor is generated based on a predetermined compensation equation for said at least one variable.

24. The system of claim 23 wherein the adjusting factor for fuel temperature is derived based on correlating measurements of ambient temperature and water engine temperature to estimate the fuel temperature.

* * * * *